Jan. 22, 1952  J. A. BEEM  2,583,291
VALVE STRUCTURE
Filed April 24, 1948

INVENTOR.
JOHN A. BEEM.
BY
Lockwood Goldsmith & Galt.
ATTORNEYS.

Patented Jan. 22, 1952

2,583,291

UNITED STATES PATENT OFFICE 2,583,291

VALVE STRUCTURE

John A. Beem, Frankfort, Ind., assignor to The Indiana Brass Co., Inc., Frankfort, Ind., a corporation Application April 24, 1948, Serial No. 23,029

1 Claim. (Cl. 251—50)

This invention relates to a valve structure that is exceptionally simple, compact and leak proof.

One object of the present invention is to prevent water access to the stem thread thereby eliminating the necessity for use of bonnet washers, packing, etc., heretofore used.

Another object of the present invention is to seal the valve stem when stationary, rotated and/or reciprocated.

The chief feature of the present invention resides in a sleeve interiorly coarse threaded, a stem exteriorly coarse threaded and a chamber therebetween in which is disposed a sealing member such as an O ring packing.

Other objects and features of the invention will be set forth more fully hereafter.

The full nature of the invention will be understood from the accompanying drawings and the following description and claims:

In the drawings Fig. 1 is a central sectional view of an embodiment of the invention, the valve member being shown in seated position.

Figure 1:
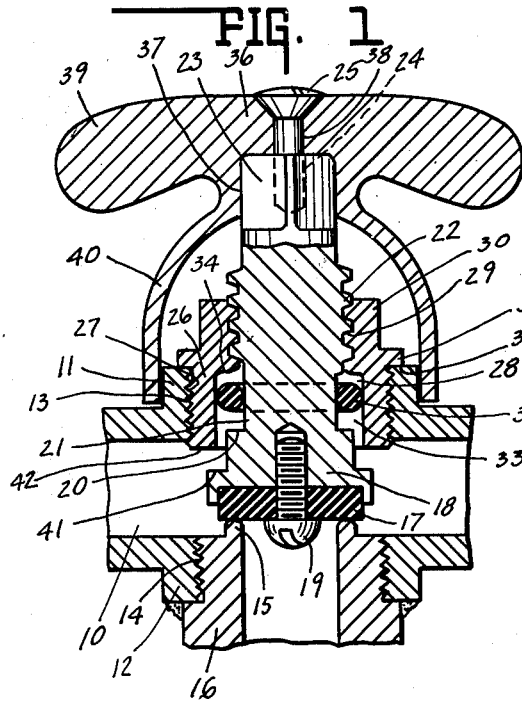

In Fig. 1 of the drawings 10 indicates a liquid pressure supply line having oppositely aligned transversely disposed internally threaded bosses 11 and 12 threaded as at 13 and 14 respectively. Secured in the latter is the valve seat 15 provided member 16.

Within the pressure chamber is a valve comprising a bibb 17 seated in head 18 and suitably secured thereto and therein as at 19. This valve has shoulder 20, reduced stem portion 21 and coarse thread portion 22. The free end may be polygonal (herein square) as indicated at 23 and tapped as at 24 to take handle retaining screw 25.

A sleeve 26 is externally threaded at 27 for threading in boss 11. It also includes internal bore 28, internal coarse thread 29 within extension 30 and a collar 31 intermediate the ends. This collar bears against shoulder or face 32 of boss 11.

As a result, when assembled, there is provided an annular channel 33 between the stem and sleeve, the latter having internal shoulder 34.

Disposed in said chamber is the O type packing ring 35, that seals both on reciprocation and rotation of the stem as well as when the stem is stationary thereby excluding all water from the stem threads and eliminating the necessity for use of a bonnet washer or equivalent packing. Herein handle 36 is suitably socketed at 37 and apertured at 38 to accommodate the stem end and anchor screw. The handle may have two or four wings 39 as shown or partake of other desired conformation. The handle has a bowl or shell portion 40 that conceals the sleeve and stem.

In application the O ring may be readily applied to the stem over the thread end and then the sleeve and stem assembled in open valve relation. Thereafter the sleeve with assembled stem is secured in boss 11.

Note that the stem has shoulder 41 adapted to engage shoulder 42 on the sleeve to prevent ring crushing.

Figure 2:
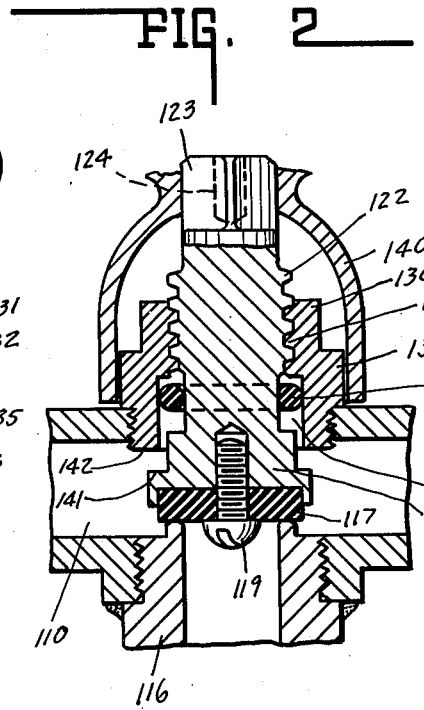
Fig. 2 is a similar view of a second embodiment of the invention differing from the first or hereinafter pointed out.

Reference will now be had to Fig. 2 wherein numerals of the one hundred series indicate parts like or corresponding to those designated by primary numerals in Fig. 1. The only differences therebetween are that collar 131 is longer and boss 11 is omitted. The greater length of the portion 131 is equal to the length of the boss. The resulting structure otherwise is the same and operates the same.

Figure 3:
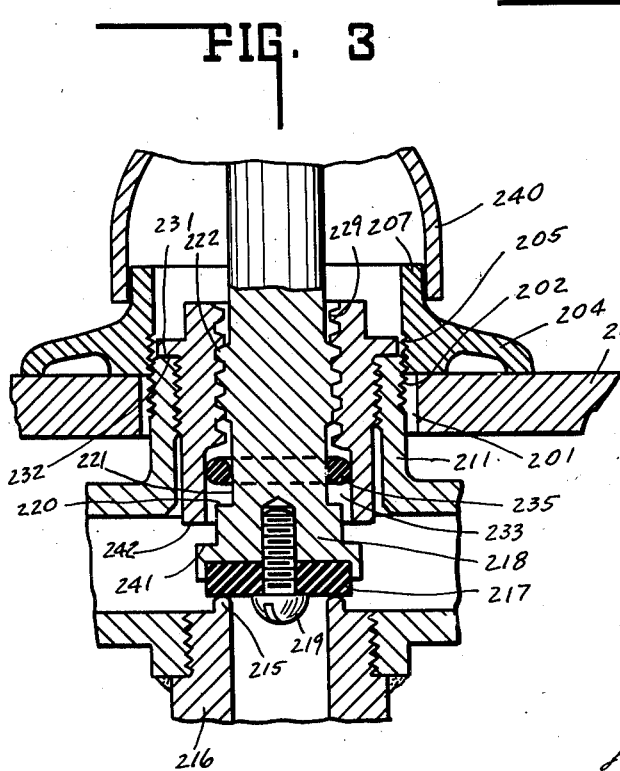
Fig. 3 is a similar view of a third embodiment of the invention and shows same applied to a sanitary fixture, the valve being upon one side thereof and the valve handle upon the other side thereof.

Reference will now be had to Fig. 3 wherein like or corresponding parts are designated by numerals of the two hundred series. Herein, however, a sanitary fixture 200 has hole 201 therethrough. Herein boss 211 is elongated and externally threaded as at 202. A hole closing ornamental and fixture mounting ring flange 204 includes an internal thread 205, that may be of taper type and same bears upon fixture 200 and is threaded upon the exterior threads 202 of said boss 211. The shield, bowl or shirt 240 of handle may here telescope the circular portion 207 of the ring 204.

Instead of the bowl being as large as illustrated it may be shallower and portion 207 may be elongated so that in handle and stem rotation and reciprocation a relatively closed relationship is maintained for all positions thereof.

Figure 4:
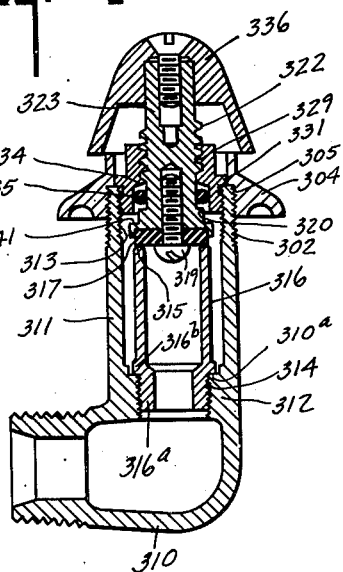
Fig. 4 is a sectional of a modified form of the invention, same being an extension of that shown in Fig. 3.

In Fig. 4 numerals of the three hundred series indicate like or similar parts. Herein 310 indicates an elbow type body portion provided with internal collar 312 internally threaded at 314 and having stop shoulder 310a. An elongated tubular valve seat member 316 has at its free end valve seat 315. The other end 316a is externally threaded and includes shoulder or collar 316b. The boss 311 comprises an elongated tubular portion internally threaded at 313 and externally threaded at 302. The coarse threaded sleeve, canopy or ring, handle, O-ring, stem and bibb complete this structure. It functions like the preceding forms.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

In a valve structure having a body portion with a threaded opening opposite a valve seat, a sleeve threaded in the opening and having a coarse threaded bore therethrough, and a valve stem having a coarse thread portion disposed in the bore and projecting oppositely therefrom for handle and seat engaging bibb accommodation, the combination therewith of an O ring packing, a portion of the sleeve having an elongated, coaxial bore therein opening into the body portion and provided with an inwardly directed shoulder at the inner end of the bore, a portion of the stem having an elongated coaxial annular groove therein terminating in a shoulder disposed in spaced relation to the coarse thread, the groove and bore forming an elongated annular channel of variable length, the O ring being disposed therein for sealing one end of the channel from the other end of the channel, the inner and outer diameters of the ring packing being less and greater, respectively, than the inner diameter of the groove and the bore diameter, and the thickness of the ring being less than the length of the channel when the valve is closed.

JOHN A. BEEM.

REFERENCES CITED

The following references are of record in the file of this patent:

UNITED STATES PATENTS

| Number | Name | Date |
|---|---|---|
| 80,066 | Gibson | July 21, 1868 |
| 212,875 | Walworth | Mar. 4, 1879 |
| 725,378 | Tetley | Apr. 14, 1903 |
| 1,285,286 | McCracken | Nov. 19, 1918 |
| 1,499,562 | Tampier | July 1, 1924 |